(12) United States Patent
Choi

(10) Patent No.: US 7,967,098 B2
(45) Date of Patent: Jun. 28, 2011

(54) EXTERIOR AIRBAG CUSHION FOR VEHICLE AND DEVICE HAVING THE SAME

(75) Inventor: Jun Yeol Choi, Seoul (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 105 days.

(21) Appl. No.: 12/479,384

(22) Filed: Jun. 5, 2009

(65) Prior Publication Data
US 2010/0116580 A1    May 13, 2010

(30) Foreign Application Priority Data

Nov. 10, 2008   (KR) .......................... 10-2008-0111033

(51) Int. Cl.
*B60R 21/36* (2011.01)
*B60R 19/20* (2006.01)
(52) U.S. Cl. ................. 180/274; 280/728.1; 296/187.04
(58) Field of Classification Search .................. 180/274; 280/728.1; 296/187.04; *B60R 21/34, 19/20*
See application file for complete search history.

(56) References Cited

U.S. PATENT DOCUMENTS

| 6,851,504 | B2* | 2/2005 | Campbell et al. | 180/271 |
| 6,910,714 | B2* | 6/2005 | Browne et al. | 280/753 |
| 6,945,559 | B2* | 9/2005 | Kassman et al. | 280/735 |
| 2005/0269805 | A1* | 12/2005 | Kalliske et al. | 280/730.1 |
| 2006/0163856 | A1* | 7/2006 | Lehmann | 280/743.1 |
| 2010/0230941 | A1* | 9/2010 | Hirth et al. | 280/733 |

FOREIGN PATENT DOCUMENTS

KR   2003-0009798   *   2/2003
WO   WO 2008/138447 A1   *   11/2008

* cited by examiner

*Primary Examiner* — Paul N Dickson
*Assistant Examiner* — Keith Frisby
(74) *Attorney, Agent, or Firm* — Morgan, Lewis & Bockius LLP

(57) ABSTRACT

An exterior airbag cushion for a vehicle is constructed so that a cushion unit is rapidly expanded ahead of a vehicle and a device having the exterior airbag cushion. The exterior airbag device includes a plurality of airbag housings which are mounted to a vehicle bumper, a cushion unit which is accommodated in the airbag housings and expanded ahead of the vehicle bumper, a shape memory wire which extends along the edge of the cushion unit, and an inflator which supplies airbag gas to provide an expansionary force.

16 Claims, 7 Drawing Sheets

EXTERIOR AIRBAG CUSHION FOR VEHICLE AND DEVICE HAVING THE SAME

The present application claims priority to Korean Application No. 10-2008-0111033, filed on Nov. 10, 2008, the entire contents of which is incorporated herein for all purposes by this reference.

BACKGROUND OF THE INVENTION

1. Field of the Invention

The present invention relates to an exterior airbag cushion for a vehicle which is constructed so that a cushion unit is rapidly expanded ahead of a vehicle, and a device having the exterior airbag cushion.

2. Description of Related Art

A vehicle is provided with an interior airbag device so as to protect a driver and a passenger against an unexpected dangerous situation. Such an interior airbag device can protect passengers in the vehicle, but has a drawback in that it never protects the vehicle itself, the opposing vehicle or persons who are outside the vehicle. In order to solve the problem, an exterior airbag device which is constructed so that an airbag cushion is expanded ahead of a vehicle in the event of a collision has been proposed. However, the conventional exterior airbag device is constructed such that the airbag cushion is expanded only by the explosive force of airbag gas, so that the expansion speed of the airbag cushion is limited in the event of a vehicle collision.

Particularly, the conventional exterior airbag device is constructed such that the airbag cushion expands from both sides of the vehicle to the center thereof. Thus, unless the airbag cushion expands rapidly, a space is created around the center of the vehicle, so that impact acting on the vehicle may increase. Therefore, an airbag cushion which expands rapidly while having sufficient rigidity is required.

BRIEF SUMMARY OF THE INVENTION

Various aspects of the present invention are directed to provide an exterior airbag cushion for a vehicle which is constructed so that a cushion unit expands rapidly and reliably, and a device having the exterior airbag cushion.

In an aspect of the present invention, an exterior airbag cushion for a vehicle, constructed so that a cushion unit surrounds a front of a bumper in case of a vehicle collision, may include the cushion unit and a shape memory wire coupled to the cushion unit and configured to extend along an outer edge of the cushion unit and thus deploy the cushion unit, wherein the shape memory wire is restored to a memorized shape corresponding to a shape of the cushion unit which has expanded fully when a temperature in the cushion unit equals or exceeds a predetermined temperature.

The shape memory wire may include a first wire extending along an upper front edge of the cushion unit, and a second wire extending along a lower front edge of the cushion unit, both ends of the first and second wires being disposed in a rear direction of the cushion unit, wherein portions of the first and second wires in the upper front edge and lower front edge are spaced with a predetermined distance in a vertical direction of the cushion unit, wherein both ends of the first and second wires are connected to form a closed loop and coupled to an airbag housing, wherein each end of the first and second wires are respectively connected to an airbag housing, wherein the first and second wires include a rectilinear portion extending between front portion and rear portion of the cushion unit, the rectilinear portion configured to be bent with a predetermined angle with a traverse direction of the vehicle, wherein a shape memory panel which is configured to be in contact with another vehicle in the vehicle collision is mounted to a front portion of the cushion unit and wherein the shape memory panel is disposed in a longitudinal direction of the cushion unit along the front portion thereof between the first and second wires.

The shape memory wire may be enclosed in the cushion unit by a tube made of a flexible material.

A shape memory panel which is configured to be in contact with another vehicle in the vehicle collision may be mounted to a front portion of the cushion unit, wherein the shape memory panel is disposed in a longitudinal direction of the cushion unit along the front portion thereof between the first and second wires.

The cushion unit may be provided with a vent hole having a shape memory wire configured to open the vent hole to evenly discharge gas when a temperature equals or exceeds a predetermined temperature.

In another aspect of the present invention, an exterior airbag device for a vehicle may include at least an airbag housing mounted to a vehicle bumper, a cushion unit accommodated in the airbag housings and configured to expand ahead of the vehicle bumper, a shape memory wire extending along an outer edge of the cushion unit to deploy the cushion unit, and an inflator supplying airbag gas to provide an expansionary force to the cushion unit wherein the shape memory wire may include a first wire extending along an upper front edge of the cushion unit, and a second wire extending along a lower front edge of the cushion unit, both ends of the first and second wires being connected to each other in a vertical direction wherein the cushion unit is provided with a vent hole having a shape memory wire configured to open the vent hole and to evenly discharge gas when temperature equals or exceeds a predetermined temperature, wherein the first and second wires include a rectilinear portion extending between front portion and rear portion of the cushion unit, the rectilinear portion configured to be bent with a predetermined angle with a traverse direction of the vehicle, wherein a shape memory panel which is configured to be in contact with another vehicle in the vehicle collision is mounted to a front portion of the cushion unit and wherein the shape memory panel is disposed in a longitudinal direction of the cushion unit along the front portion thereof between the first and second wires.

An expansion guide may be installed in the cushion unit to guide a flow of the airbag gas in the inflator, and an expansion wire including shape memory alloy is inserted into the expansion guide.

The methods and apparatuses of the present invention have other features and advantages which will be ant from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

As shown in FIGS. 1 to 5, an exterior airbag cushion according to various exemplary embodiments of the present invention is characterized in that the rapid expansion of a cushion unit 100 is guided by a shape memory wire 110 which is installed along the edge of the cushion unit 100.

To this end, the shape memory wire 110 is provided on the edge of the cushion unit 100 and deformed in the shape in which the cushion unit 100 has fully expanded, under a predetermined temperature or higher. The shape memory wire 110 uses the properties of restoring a processed object to its original shape when heat is applied to the processed object. The shape memory wire 110 supports the frame of the cushion unit 100 in the shape which was memorized, namely, the state of the cushion unit 100 expanding fully. Here, the temperature at which the shape of the shape memory wire 110 is recovered may be adjusted as desired by controlling conditions of thermal treatment.

That is, in various embodiments of the present invention, when an airbag gas of 500° C. or higher is fed into the cushion unit 100, the cushion unit 100 is inflated by the inflation force of the airbag gas, and simultaneously is inflated by the restoring force of the shape memory wire 110, so that the cushion unit 100 can instantaneously expand rapidly.

According to various embodiments, the shape memory wire 110 uses a Ni—Ti-based shape memory alloy which may be restored one million or more times through thermal treatment. In addition to Ni—Ti alloy, Cu—Zn—Al, Cu—Al—Ni, Ti—Ni alloy, etc. may be used. It is possible to use shape memory plastics, for example, polyurethane materials. Since the shape memory wire 110 is made of porous and fine particles, a shock absorbing effect is expected.

Figure 1:
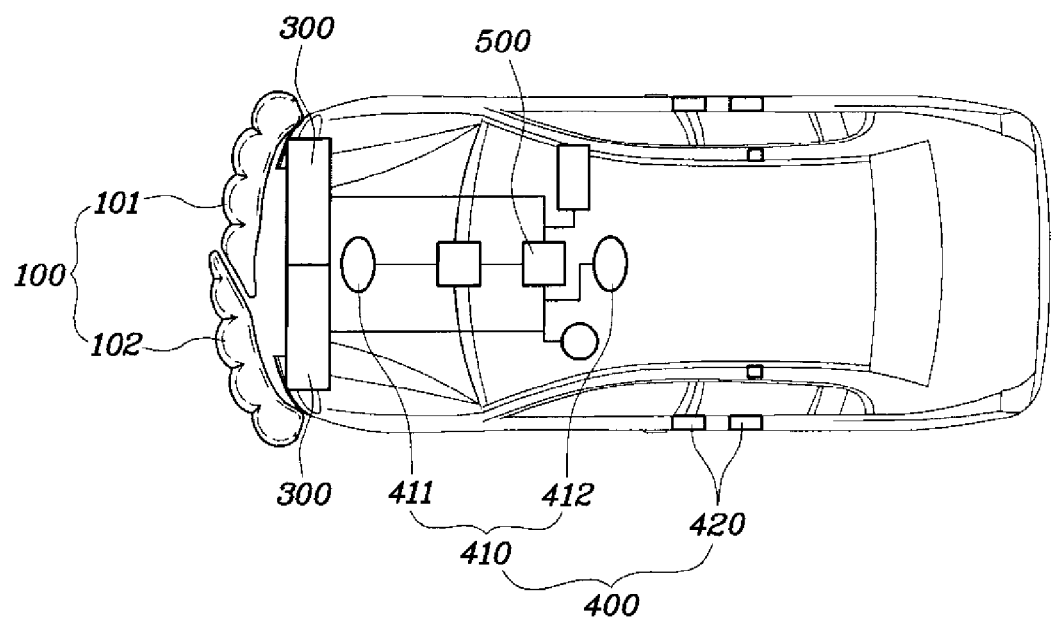
FIG. 1 is a view illustrating the construction of an exemplary exterior airbag device for a vehicle according to the present invention.
Figure 2:
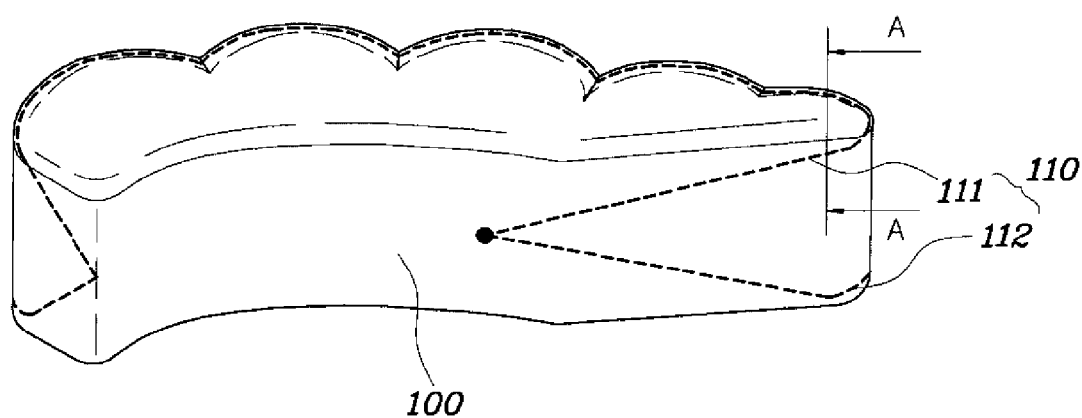
FIG. 2 is a view illustrating the construction of an exemplary exterior airbag cushion for a vehicle according to the present invention.
Figure 3:
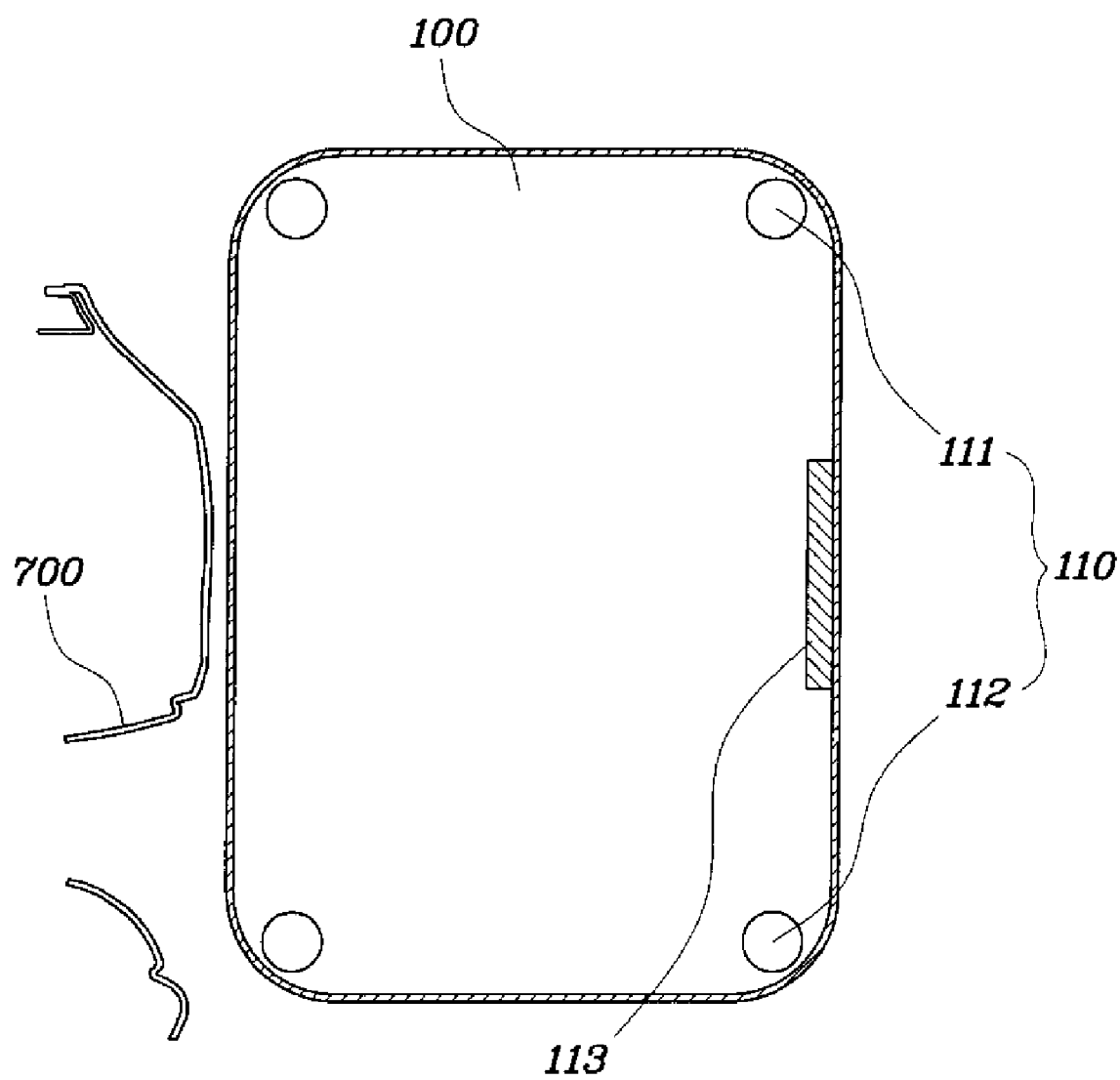
FIG. 3 is a sectional view taken along line "A-A" of FIG. 2.
Figure 4:
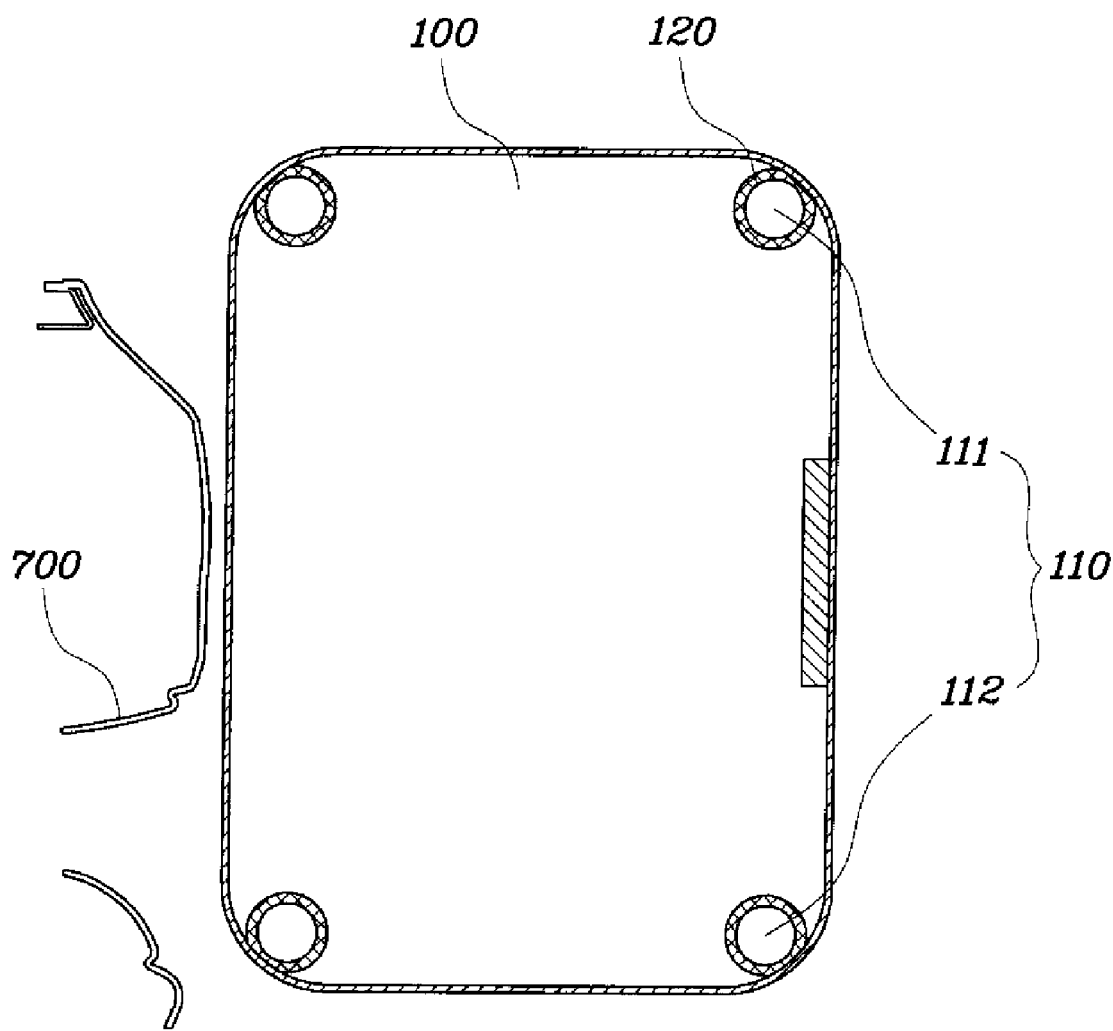
FIG. 4 is a view illustrating the construction in which an exemplary shape memory wire is mounted, via a tube, to the exemplary exterior airbag cushion for a vehicle according to the present invention.
Figure 5:
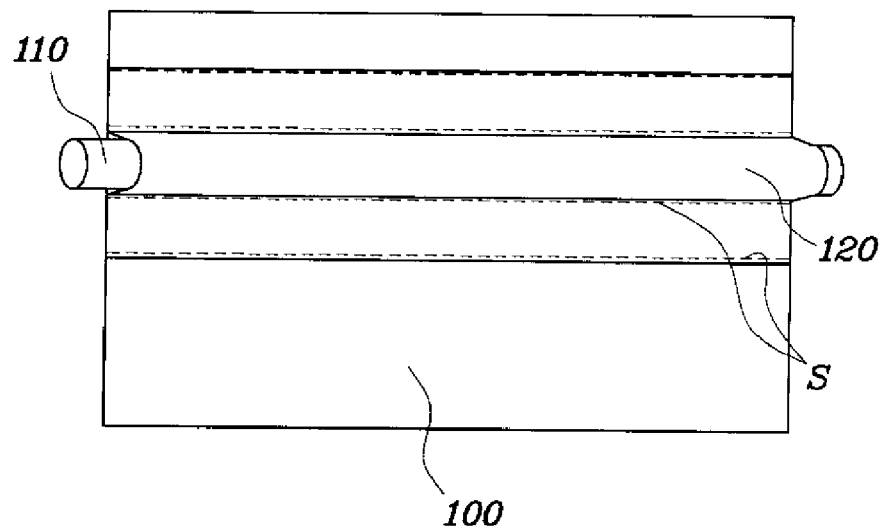
FIG. 5 is a view illustrating the state in which the shape memory wire is mounted to the exemplary exterior airbag cushion for a vehicle according to the present invention.

The shape memory wire 110 includes a first wire 111 which extends along the upper edge of the cushion unit 100, and a second wire 112 which extends along the lower edge of the cushion unit 100. Both ends of the first and second wires 111 and 112 are connected to each other in a vertical direction to form a closed loop as shown in FIG. 2. Thereby, the shape memory wire 110 may form the frame of the cushion unit 100 when it expands fully.

The first and second wires 111 and 112 may include a rectilinear portion that is configured to be bent with a predetermined angle with a traverse direction of the vehicle so that an edge of the cushion unit 100 may be overlapped with the other cushion unit.

In other embodiments of the present invention, the shape memory wire 110 is installed in the cushion unit 100 via a flexible tube 120. The tube 120 is made of a flexible material, such as fabric or vinyl, to surround the shape memory wire 110. Such a tube 120 is secured to the cushion unit 100 through sewing S, bonding or taping. Preferably, the tube 120 has an inner diameter corresponding to the outer diameter of the shape memory wire 110 such that the associated inner surface of the tube 120 is in complete close contact with the outer surface of the shape memory wire 110.

In still further other embodiments of the present invention, a shape memory panel 113 having the shape of a flat panel may be attached to the cushion unit 100. The shape memory panel 113 is provided on the front of the cushion unit 100 which contacts with the other involved vehicle. Thus, in the event of a vehicle collision, the shape memory panel 113 can effectively absorb impact energy, in addition to maintaining the rigidity of the cushion unit 100.

Figure 6:
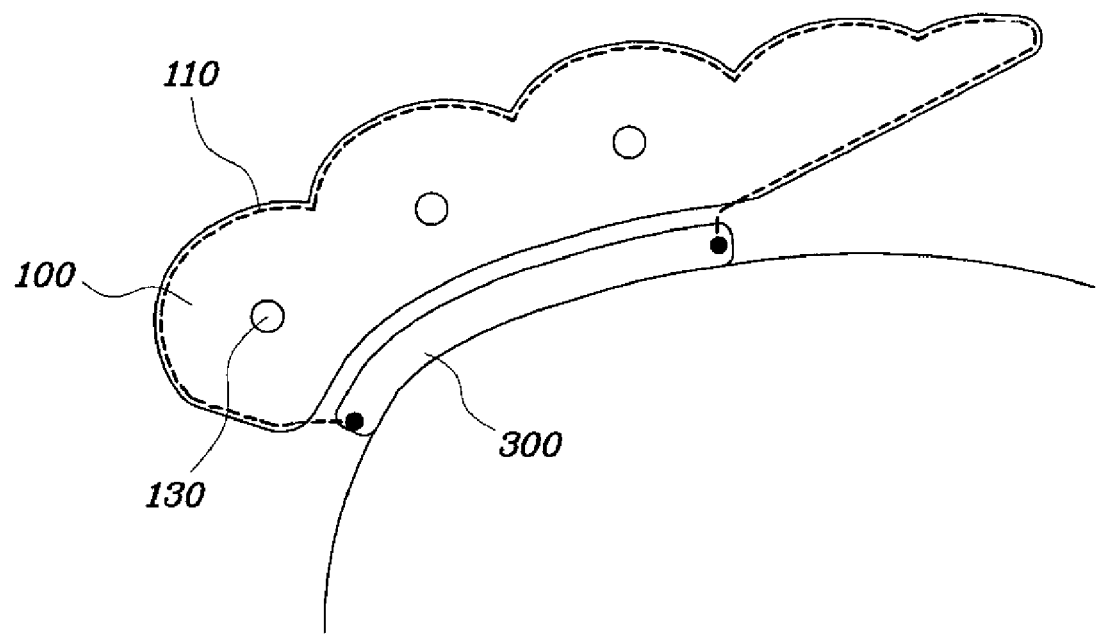
FIG. 6 is a plan view illustrating the state in which vent holes are formed in the exemplary exterior airbag cushion for a vehicle according to the present invention.
Figure 7A:
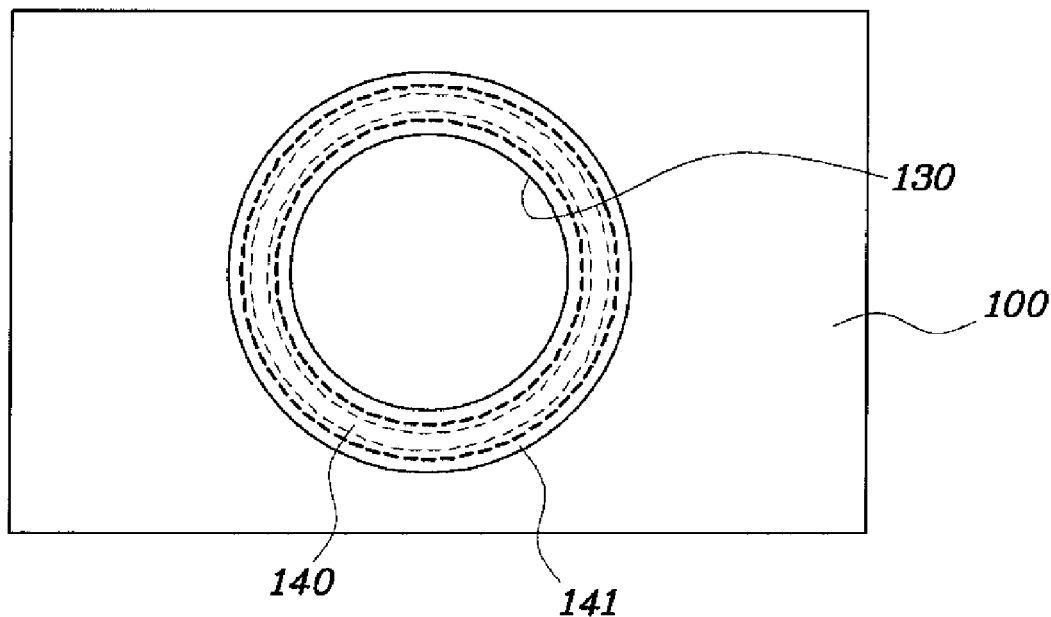
FIGS. 7A and 7B are views illustrating the operation of the vent hole formed in the exemplary exterior airbag cushion for a vehicle according to the present invention.
Figure 7B:
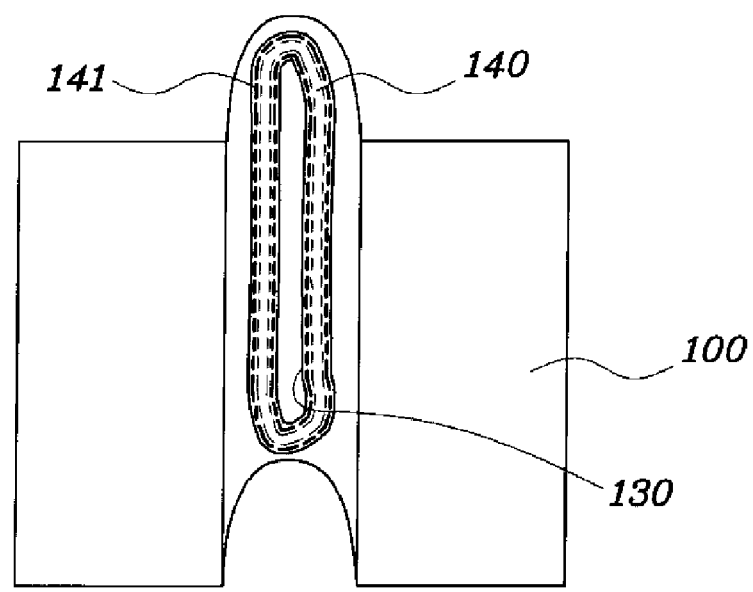

As shown in FIGS. 6 to 7B, vent holes 130 each having a shape memory wire 140 may be formed in the cushion unit 100. Each vent hole 130 surrounds the shape memory wire 140 through a ring-shaped tube 141. Thus, when the temperature of the cushion unit 100 equals or exceeds a predetermined temperature, each vent hole 130 opens in the ring shape, and the airbag gas can be evenly discharged from the cushion unit 100.

Such a cushion unit 100 is bent along the cushion folding line of the airbag housing 300 of an exterior airbag device to be received in the airbag housing 300.

Furthermore, FIG. 6 shows another exemplary embodiment in which both ends of the first and second wires 111 and 112 are not connected to each other but connected to the airbag housing 300 respectively.

Figure 8:
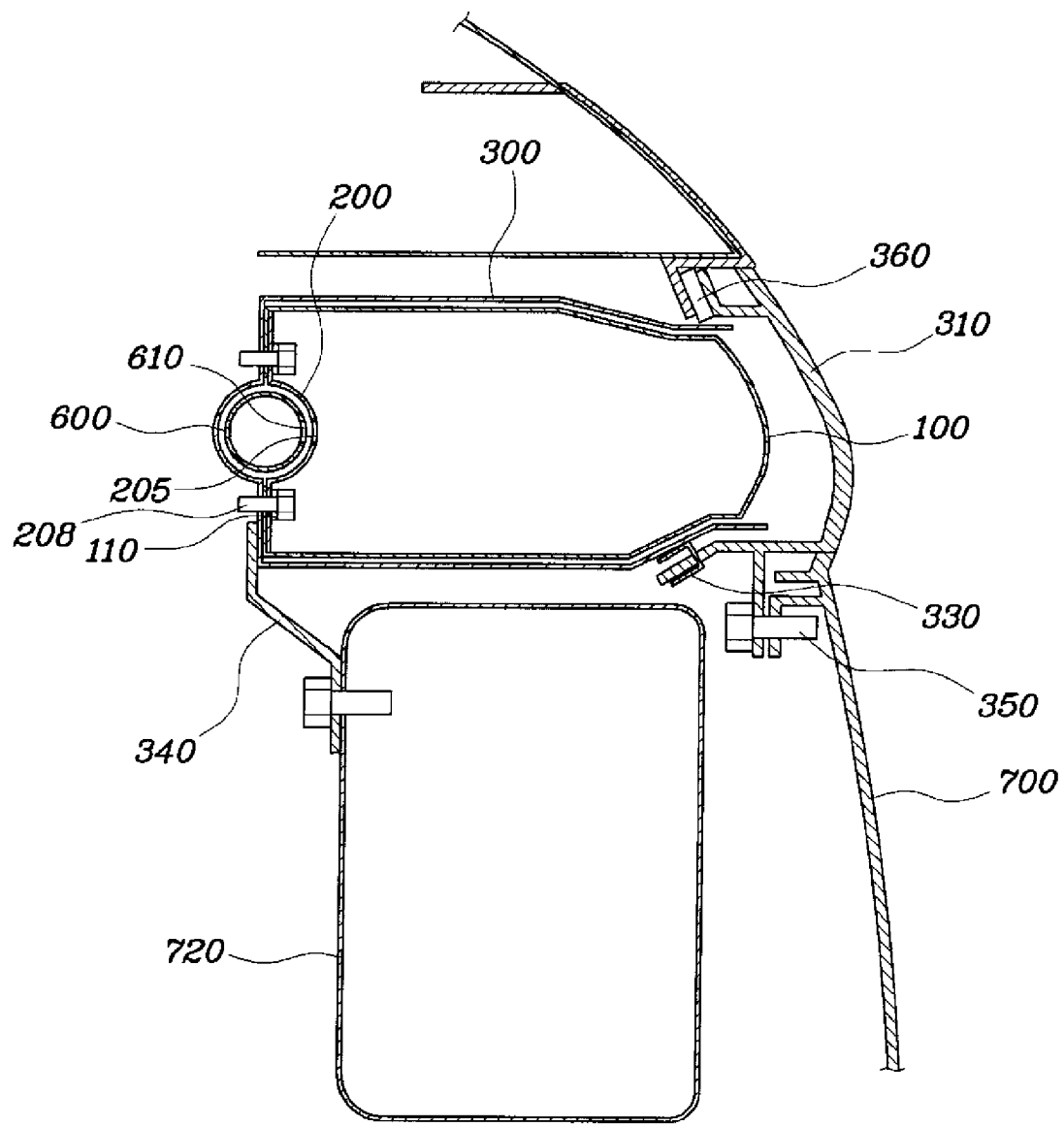
FIG. 8 is a view illustrating the state in which the exemplary exterior airbag cushion for a vehicle according to the present invention is installed in an airbag housing.
Figure 9A:
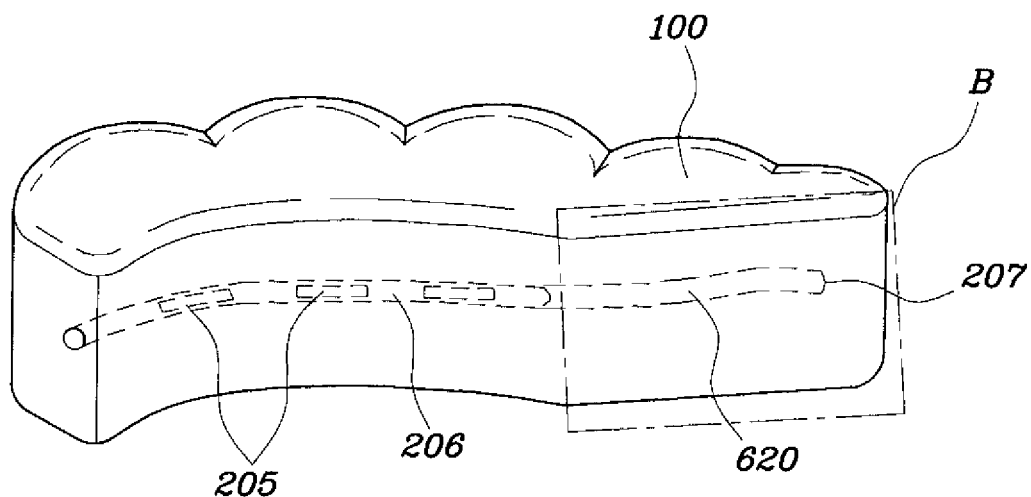
FIG. 9A is a view illustrating the state in which an expansion guide is installed in the exemplary exterior airbag cushion for a vehicle according to the present invention.
Figure 9B:
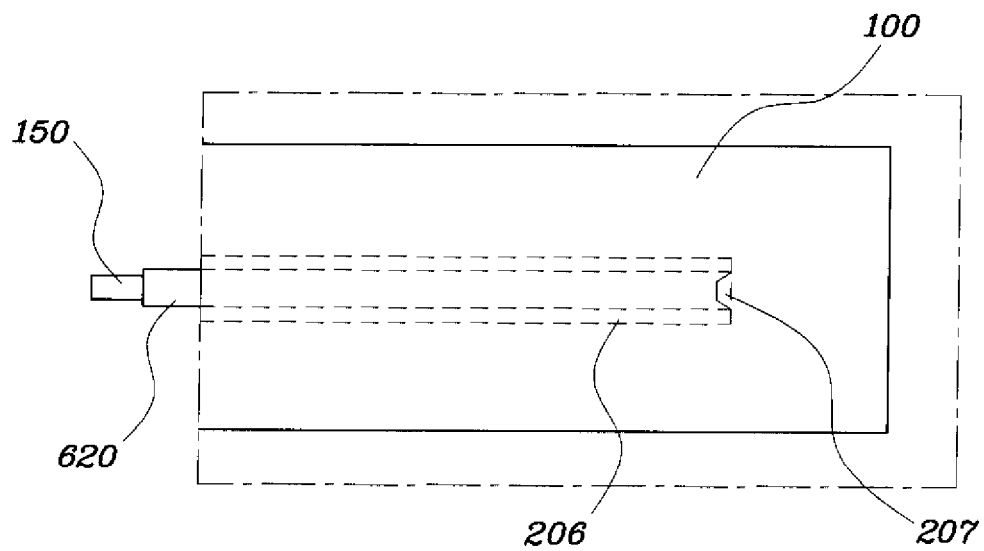
FIG. 9B is an enlarged view illustrating portion "B" of FIG. 9A.

As shown in FIGS. 8 to 9B, the exterior airbag device according to various embodiments of the present invention is characterized in that the shape memory wire 110 is installed along the edge of the cushion unit 100, and the cushion unit 100 is folded in the airbag housing 300, thus guiding the rapid expansion of the cushion unit 100 in the event of a vehicle collision.

In a detailed description, the exterior airbag device includes a cushion unit 100 accommodated in a plurality of airbag housings 300, a shape memory wire 110 provided on the edge of the cushion unit 100, and an inflator (not shown) supplying airbag gas such that the cushion unit 100 expands ahead of a vehicle bumper 700.

The cushion unit 100 is folded along an associated cushion folding line to be received in the airbag housings 300, and expands to surround the front of the bumper 700 when the cushion unit 100 has fully expanded. Particularly, the shape memory wire 110 is provided along the edge of the cushion unit 100. Since the general construction of the shape memory wire 110 remains the same as that of the shape memory wire 110 applied to the above-mentioned exterior airbag cushion, the detailed description of the shape memory wire 110 will be omitted herein.

Gas supply holes 205 are formed in the cushion unit 100 to supply airbag gas. The gas supply holes 205 are the passage through which the airbag gas supplied from the inflator flows into the cushion unit 100. The gas supply holes 205 communicate with a guide hole 206 which passes through the cushion unit 100 in a longitudinal direction thereof. That is, after the airbag gas supplied from the inflator flows into the guide hole 206, the airbag gas is evenly distributed and supplied in the longitudinal direction of the cushion unit 100 though the gas supply holes 205.

A gas distributor 600 which is coupled to the inflator may be inserted into the guide hole 206. The gas distributor 600 functions to appropriately distribute the airbag gas of the inflator in the longitudinal direction of the cushion unit 100. Gas distribution holes 610 are formed in the gas distributor 600 so that the airbag gas circulates in the gas distribution holes 610. The gas distribution holes 610 are placed to face the gas supply holes 205 of the cushion unit 100.

An expansion guide 620 may be provided in the guide hole 206 to transmit the airbag gas to an end of the cushion unit 100. The expansion guide 620 is constructed to be coupled to an end of the gas distributor 600 and communicate with an end hole 207 of the cushion unit 100. Preferably, the expansion guide 620 is made of a flexible material such as fabric or vinyl to allow the cushion unit 100 to be smoothly folded. The expansion guide 620 is secured to the cushion unit 100 through sewing, bonding or taping.

Particularly, an expansion wire 150 shaped of a ring may be inserted into the expansion guide 620. The expansion wire 150 is made of shape memory alloy, so that it is restored to the shape of the cushion unit 100 expanding fully, in the event of a vehicle collision. Thus, the airbag gas supplied from the gas distributor 600 may be transmitted through the expansion guide 620 to the end of the cushion unit 100 in the longitudinal direction, and the cushion unit 100 may fully expand rapidly and smoothly thanks to the action of the expansion wire 150.

When the cushion unit 100 has fully expanded, neighboring side ends overlap each other, thus forming an overlapping part and wholly surrounding the front of a vehicle bumper 700. The cushion unit 100 comprises a first cushion unit 101 which is provided on one end of the vehicle bumper 700 and deployed so that its side end surrounds the center of the front of the vehicle, and a second cushion unit 102 which is provided on the other end of the vehicle bumper 700 and deployed so that its side end surrounds the side end of the first cushion unit 101.

The above shape memory wire 110 is provided on the edge of each of the first and second cushion units 101 and 102. Thus, when the cushion unit 100 expands fully, the first and second cushion units 101 and 102 expand such that their side ends are opposite each other in a diagonal direction.

The cushion unit 100 is mounted to the vehicle bumper 700 using the airbag housing 300. The airbag housing 300 accommodates the cushion unit 100 therein, and is mounted to a bumper back beam 720 via a mounting bracket 340.

An airbag door 310 is mounted to the airbag housing 300 and is opened when the cushion unit 100 expands. The airbag door 310 is secured at its upper portion to the vehicle bumper 700 using a double-sided adhesive 360 or a bolt. The lower portion of the airbag door 310 is secured to the airbag housing 300 via a clip 330 and is fastened to the vehicle bumper 700 via a fastening bolt 350. That is, when the cushion unit 100 expands, the upper portion of the airbag door 310 is separated from the vehicle bumper 700 by the inflationary force of the cushion unit 100, so that the clip 330 separates from the airbag housing 300 and the lower portion of the airbag door 310 is held by the fastening bolt 350 of the vehicle bumper 700. At this time, the airbag housing 300 has opened, and the cushion unit 100 has expanded ahead of the vehicle through the opening, thus absorbing shocks from the opposing object involved in the collision.

Further, a cushion holder 200 is installed in the airbag housing 300 to support the gas distributor 600. The cushion unit 100 is secured between the airbag housing 300 and the cushion holder 200. An end of the shape memory wire 110 is wound and secured to a support member 208 which supports the cushion holder 200.

The expansion of the cushion unit 100 is implemented by a sensing unit 400 and a control unit 500.

The sensing unit 400 detects the speeds of the vehicle itself and the other object involved in the impact and the distance between the vehicle itself and the other involved object, prior to sending a detected signal to the control unit 500. To this end, the sensing unit 400 includes an other-object sensor 410 which detects the speed and distance of an opposing object before a collision, and a primary-vehicle sensor 420 which detects the speed and distance of the primary vehicle (the vehicle itself).

Here, the other-object sensor 410 may use a radar sensor 411 which detects the speed and distance of the opposing object before the collision, and a camera sensor 412 which captures the image of the opposing object. Meanwhile, the primary-vehicle sensor 420 may use a vehicle speed sensor which detects the speed and distance of the primary vehicle, a steering angle sensor, a wheel speed sensor, or a G sensor.

That is, when a signal detected by the sensing unit 400 is transmitted to the control unit 500, the control unit 500 determines the state of the primary vehicle just before the collision, using the detected signal. If it is predicted that the vehicle collision is occurring, the expansion signal is applied and transmitted to the inflator, so that the cushion unit 100 expands ahead of the vehicle. At this time, when the relative speed between the primary vehicle and the opposing object is a predetermined speed or more and the distance between the primary vehicle and the opposing object is a predetermined distance or less, the control unit 500 determines that the primary vehicle will not collide with the opposing object yet and applies the expansion signal to the inflator.

As described above, the present invention is advantageous in that the shape restoring force of a shape memory wire when expanded fully is added to the inflationary force of airbag gas, thus guiding the rapid expansion of a cushion unit.

Further, the present invention is advantageous in that the eccentricity of a cushion unit and the deviation of the expanded shape of the cushion unit are reduced, so that the cushion unit expands uniformly and reliably in a normal shape.

Furthermore, the present invention is advantageous in that a shape memory wire forms the edge of a cushion unit, thus securing the rigidity of the cushion unit, and effectively absorbing impact energy.

For convenience in explanation and accurate definition in the appended claims, the terms "upper", "lower", "front", "interior", and "exterior" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An exterior airbag cushion for a vehicle comprising:
   a cushion unit that surrounds a forward portion of a bumper upon a vehicle collision; and
   a shape memory wire coupled to the cushion unit and configured to extend along an outer edge of the cushion unit and thus deploy the cushion unit, wherein the shape memory wire is restored to a memorized shape corresponding to a shape of the cushion unit which has expanded fully when a temperature in the cushion unit equals or exceeds a predetermined temperature;
   wherein the shape memory wire is enclosed in the cushion unit by a tube made of a flexible material.

2. The exterior airbag cushion as set forth in claim 1, wherein the shape memory wire comprises:
   a first wire extending along an upper front edge of the cushion unit; and
   a second wire extending along a lower front edge of the cushion unit, both ends of the first and second wires being disposed in a rear direction of the cushion unit, wherein portions of the first and second wires in the upper front edge and lower front edge are spaced with a predetermined distance in a vertical direction of the cushion unit.

3. The exterior airbag cushion as set forth in claim 2, wherein both ends of the first and second wires are connected to form a closed loop and coupled to an airbag housing.

4. The exterior airbag cushion as set forth in claim 2, wherein each end of the first and second wires are respectively connected to an airbag housing.

5. The exterior airbag cushion as set forth in claim 2, wherein the first and second wires include a rectilinear portion extending between a front portion and a rear portion of the cushion unit, the rectilinear portion configured to be bent with a predetermined angle with a traverse direction of the vehicle.

6. The exterior airbag cushion as set forth in claim 2, wherein a shape memory panel which is configured to be in contact with another vehicle in the vehicle collision is mounted to a front portion of the cushion unit.

7. The exterior airbag cushion as set forth in claim 6, wherein the shape memory panel is disposed in a longitudinal direction of the cushion unit along the front portion thereof between the first and second wires.

8. The exterior airbag cushion as set forth in claim 1, wherein a shape memory panel which is configured to be in contact with another vehicle in the vehicle collision is mounted to a front portion of the cushion unit.

9. The exterior airbag cushion as set forth in claim 8, wherein the shape memory panel is disposed in a longitudinal direction of the cushion unit along the front portion thereof between first and second wires.

10. The exterior airbag cushion as set forth in claim 1, wherein the cushion unit is provided with a vent hole having a shape memory wire configured to open the vent hole to evenly discharge gas when a temperature equals or exceeds a predetermined temperature.

11. An exterior airbag device for a vehicle, comprising:
    airbag housings mounted to a vehicle bumper;
    a cushion unit accommodated in the airbag housings and configured to expand ahead of the vehicle bumper;
    a shape memory wire extending along an outer edge of the cushion unit to deploy the cushion unit; and
    an inflator supplying airbag gas to provide an expansionary force to the cushion unit;
    wherein the shape memory wire comprises:
      a first wire extending along an upper front edge of the cushion unit; and
      a second wire extending along a lower front edge of the cushion unit, both ends of the first and second wires being connected to each other in a vertical direction.

12. The exterior airbag device as set forth in claim 11, wherein the cushion unit is provided with a vent hole having a shape memory wire configured to open the vent hole and to evenly discharge gas when temperature equals or exceeds a predetermined temperature.

13. The exterior airbag cushion as set forth in claim 11, wherein first and second wires include a rectilinear portion extending between a front portion and a rear portion of the cushion unit, the rectilinear portion configured to be bent with a predetermined angle with a traverse direction of the vehicle.

14. The exterior airbag cushion as set forth in claim 11, wherein a shape memory panel which is configured to be in contact with another vehicle in the vehicle collision is mounted to a front portion of the cushion unit.

15. The exterior airbag cushion as set forth in claim 14, wherein the shape memory panel is disposed in a longitudinal direction of the cushion unit along the front portion thereof between first and second wires.

16. The exterior airbag device as set forth in claim 11, wherein an expansion guide is installed in the cushion unit to guide a flow of the airbag gas in the inflator, and an expansion wire comprising shape memory alloy is inserted into the expansion guide.

* * * * *